United States Patent [19]

Ishioka et al.

[11] Patent Number: 6,126,850
[45] Date of Patent: Oct. 3, 2000

[54] FREEZE-PREVENTING MATERIAL AND METHOD FOR PREVENTING PAVEMENT SURFACE FROM FREEZING

[75] Inventors: Nobuya Ishioka, Tokyo; Tetsuhiko Yamaguchi, Kanagawa; Masaki Sazawa; Kenichi Kitamura, both of Ibaraki-ken, all of Japan

[73] Assignee: Showa Denko Kabushiki Kaisha, Tokyo, Japan

[21] Appl. No.: 09/166,794

[22] Filed: Oct. 6, 1998

[30] Foreign Application Priority Data

Apr. 16, 1998 [JP] Japan .................................. 10-106110

[51] Int. Cl.$^7$ ....................................................... C09K 3/18
[52] U.S. Cl. .............................. 252/70; 106/13; 106/724; 106/728; 106/802; 106/810; 106/823
[58] Field of Search .............................. 106/13, 724, 728, 106/802, 810, 823; 252/70

[56] References Cited

U.S. PATENT DOCUMENTS

| | | | |
|---|---|---|---|
| 3,389,118 | 6/1968 | Gordon | 524/4 |
| 4,094,805 | 6/1978 | Hansen | 252/70 |
| 4,148,938 | 4/1979 | Hansen | 427/136 |
| 4,434,190 | 2/1984 | Dubois et al. | 427/136 |
| 4,585,486 | 4/1986 | Fujita et al. | 264/333 |
| 5,407,996 | 4/1995 | Aizawa et al. | 524/555 |
| 5,891,225 | 4/1999 | Mishra et al. | 106/14.42 |

FOREIGN PATENT DOCUMENTS

| | | |
|---|---|---|
| 197 20 212 | 12/1997 | Germany . |
| 4-149051 | 5/1992 | Japan . |

OTHER PUBLICATIONS

Derwent Abstract No. 1992–192745, abstract of Chinese Patent Specification No. 1054432. (Nov. 1991).
Derwent Abstract No. 1974–44673V, abstract of Japanese Patent Specification No. 74–020048. (May 1974).
Derwent Abstract No. 1982–19575E, abstract of Soviet Union Patent Specification No. 832059. (May 1981).
JP 02 133357 A, Patent Abstracts of Japan, vol. 014, No. 363, May 22, 1990.
JP 63 130691 A, Patent Abstracts of Japan, vol. 012, No. 382, Jun. 2, 1988.
JP 08 199151 A, Patent Abstracts of Japan, vol. 096, No. 12, Aug. 6, 1996.
JP 63 039304, Database WPI, Week 8813, XP002108848, Feb. 19, 1988.

*Primary Examiner*—Anthony Green
*Attorney, Agent, or Firm*—Sughrue, Mion, Zinn, Macpeak & Seas, PLLC

[57] ABSTRACT

A freeze-preventing material comprises cement, salt, and water-absorbing resins. The freeze-preventing material is scattered on the pavement surface in the form of slurry to prevent the pavement surface from freezing. Thereby a freeze-preventing effect is maintained for a long period of time owing to the water-absorbing resins which absorb and retain the salt in large amounts. The anti-freezing effect can be restored by spraying the pavement with the salt again.

5 Claims, 4 Drawing Sheets

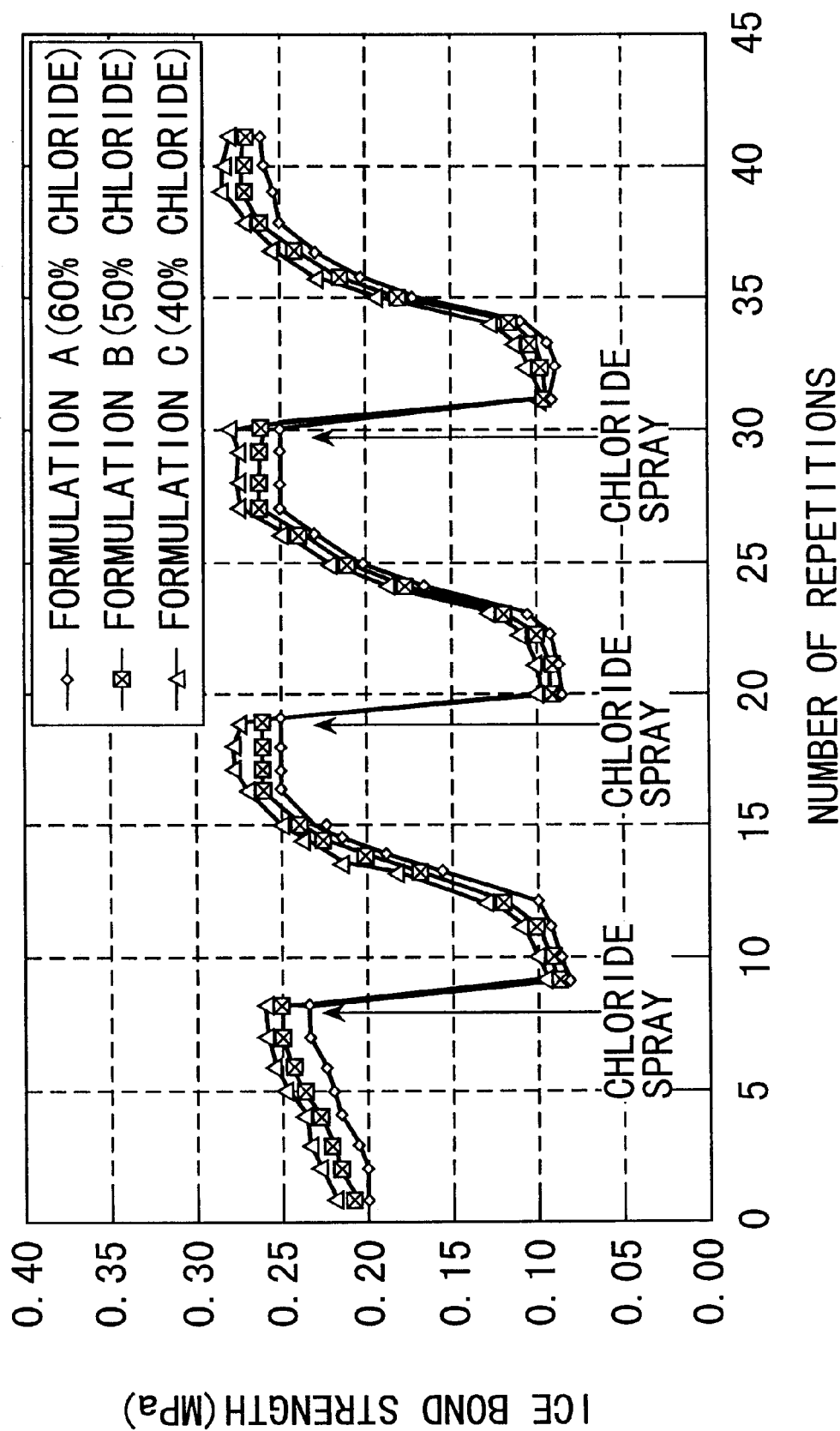

FREEZE-PREVENTING MATERIAL AND METHOD FOR PREVENTING PAVEMENT SURFACE FROM FREEZING

BACKGROUND OF THE INVENTION

1. Field of the Invention

The present invention relates to a freeze-preventing material to prevent the pavement surface of roads, sidewalks, parking areas, etc. from freezing. The present invention relates also to a method for freeze-prevention with said freeze-preventing material.

2. Description of the Prior Art

There have been contrived various methods for retarding the pavement surface from freezing in cold snowy districts. They employ, for example, an asphalt mix incorporated with a salt, i.e., salt-like material such as calcium chloride or with an elastomer such as rubber. The former retards freezing through the freeze point depression by the salt. It achieves its object by chemical actions. The latter retards freezing because the elastomer renders the pavement flexible enough to permit ice sticking to its surface to be broken by traffic loads. It achieves its object by ice breaking.

The salt-containing pavement becomes ineffective after one to two years because of leaching of the salt. Likewise, the elastomer-containing pavement tends to flow in summer on account of its generally low combined strength.

SUMMARY OF THE INVENTION

Therefore, it is important that the pavement exhibit the freeze-preventing effect over a prolonged period and recover it after its loss.

The present invention is directed to a freeze-preventing material which comprises cement, salt, and water-absorbing resins.

In another aspect, the present invention is directed to a method for preventing the pavement surface from freezing, said method comprising scattering in the form of slurry above-mentioned freeze-preventing material over the pavement surface.

In its slurry form, the water-absorbing resins absorb and retain a large amount of salt. The scattered slurry infiltrates into interstices in the pavement such as asphalt pavement and solidifies there as the cement sets. The salt in the resulting solids prevents the pavement surface from freezing by its freeze point depression.

The freeze-preventing effect produced in this manner lasts long, although decreases gradually, due to the fact that the water-absorbing resins absorbs and retains a large amount of salt. In addition, the freeze-preventing effect can be recovered by scattering the same salt again over the pavement surface, because the scattered salt is retained densely by the water-absorbing resins.

In another aspect, the freeze-preventing method of the present invention is characterized by giving vibration to the slurry and pavement surface after the scattering of the slurry. This vibration drives bubbles out of the pavement and infiltrates the slurry into evacuated voids. In this way it is possible to improve the efficiency of infiltrating the slurry in large amounts into the pavement.

The foregoing step may be followed by raking to remove excess slurry and ensure adequate friction on the pavement surface.

The above-mentioned water-absorbing resins may be a polymer which absorbs and retains 20% aqueous solution of calcium chloride 10 times or more its weight. In this manner, more salt can be absorbed and retained by the water-absorbing resins.

The polymer may be at least one member selected from poly-N-vinylcarboxamides, polyacrylamides, polyvinyl alcohols, and polyethylene oxides.

The above-mentioned salt may also be an acetate, which is more effective than calcium chloride because of its lower freeze point depression by about 20° C. Moreover, acetates are less corrosive to iron and other metals.

In another aspect of the present invention, the freeze-preventing method is characterized by giving vibration to the slurry and pavement surface after the scattering of the slurry. This vibration drives bubbles out of the pavement and infiltrates the slurry into evacuated voids. In this way it is possible to improve the efficiency of infiltrating the slurry in large amounts into the pavement.

The accompanying drawings are included to provide a further understanding of the invention and are incorporated in and constitute a part of this specification, to illustrate the embodiments of the invention, and, together with the description, to explain the principles of the invention.

BRIEF DESCRIPTION OF THE DRAWINGS

FIG. 4 is a graphical representation of the result of repeated tests for ice bond strength of the freeze-preventing pavement pertaining to the present invention.

DESCRIPTION OF THE PREFERRED EMBODIMENTS

The invention will be described in more detail with reference to the examples that follow.

According to the present invention, the freeze-preventing material, i.e., anti-freezing material comprises cement, salts selected from various salt-like materials, and water-absorbing resins, i.e., hygroscopic plastics. Prior to use, it is mixed with water in a prescribed ratio to yield a slurry, i.e., cement milk, and the resulting slurry is scattered over the asphalt pavement surface and allowed to infiltrate into interstices in the pavement.

Figure 1:
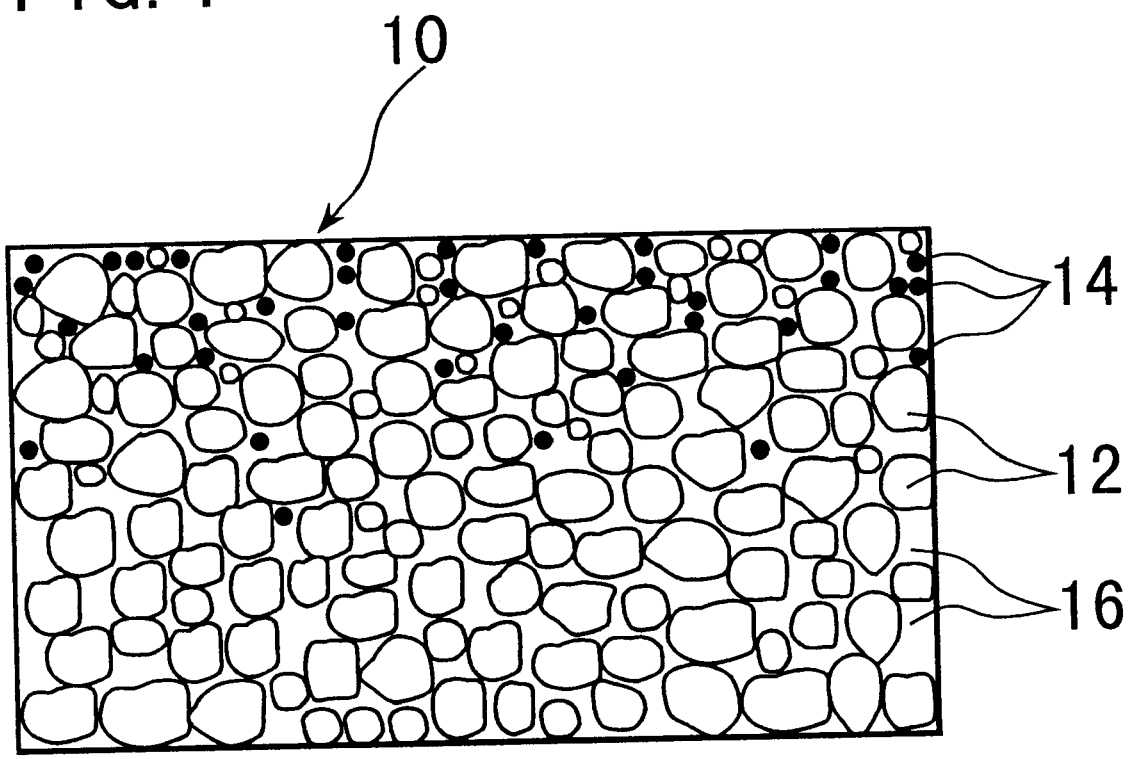
FIG. 1 is a sectional view showing an embodiment of the freeze-preventing pavement pertaining to the present invention.

FIG. 1 is a partial sectional view of the anti-freeze pavement 10 obtained as mentioned above.

The asphalt pavement is formed by mixing aggregates having a prescribed particle diameter with asphalt at a prescribed temperature, and laying or paving with its mixed material. Such asphalt pavement is formed from asphalt concrete or open-graded asphalt mixture 12, and functions as the base for the anti-freeze pavement.

In the slurry, the salt is present in the form of aqueous solution, which is absorbed in a large amount by the water-absorbing resins 14. The water-absorbing resins 14 holding the salt in a large amount infiltrates into interstices in the open-graded asphalt mixture 12. At the same time, the cement milk 16 (which is a cement-water mixture) also infiltrates into interstices in the open-graded asphalt mixture 12.

The open-graded asphalt mixture 12 is obtained by hot-mixing asphalt, aggregates having a prescribed particle diameter, and filler, as in the case of open-graded asphalt mixture used for ordinary semi-flexible pavements. The pavement 10 is formed from the open-graded asphalt mixture 12 laid or paved in the same way as ordinary semi-flexible pavements are formed.

An example of the Marshall test standard of the open-graded asphalt mixture as the base of the anti-freeze pavement is shown in Table 1, and an example of the condition for paving is shown in Table 2.

TABLE 1

| ITEM | STANDARD VALUE |
| --- | --- |
| DENSITY (g/cm$^3$) | 1.90 AND BELOW |
| STABILITY (kgf) | 300 AND UP |
| FLOW VALUE (1/100 cm) | 20 ~ 40 |
| VOIDS IN TOTAL MIX (%) | 20 ~ 28 |
| AMOUNT OF ASPHALT (%) | 3 ~ 4 |

(NOTE) COMPACTED 50 TIMES ON BOTH SIDES.

TABLE 2

| | BED LEVELING | INITIAL ROLLING (MACADAM ROLLER) | SECONDARY ROLLING (12-t TIRE ROLLER) |
| --- | --- | --- | --- |
| NUMBER OF REPETITIONS OF ROLLING | | 8 TIMES AND UP | TWICE |
| TEMPERATURE | 150 ± 10° C. | 120 ± 10° C. | 70 ± 10° C. |

(NOTE) ONE-WAY PASSAGE OF ROLLING IS COUNTED AS ONE

Paving should preferably be carried out mechanically by the aid of an asphalt finisher rather than manually so as to avoid uneven injection of the milk or slurry caused by the separation of the asphalt pavement material. In addition, it is preferable not to apply machine oil to the smoothing rollers to prevent the sticking of the asphalt mixture. It is also preferable to minimize water to be sprayed onto the smoothing rollers.

Figure 2:
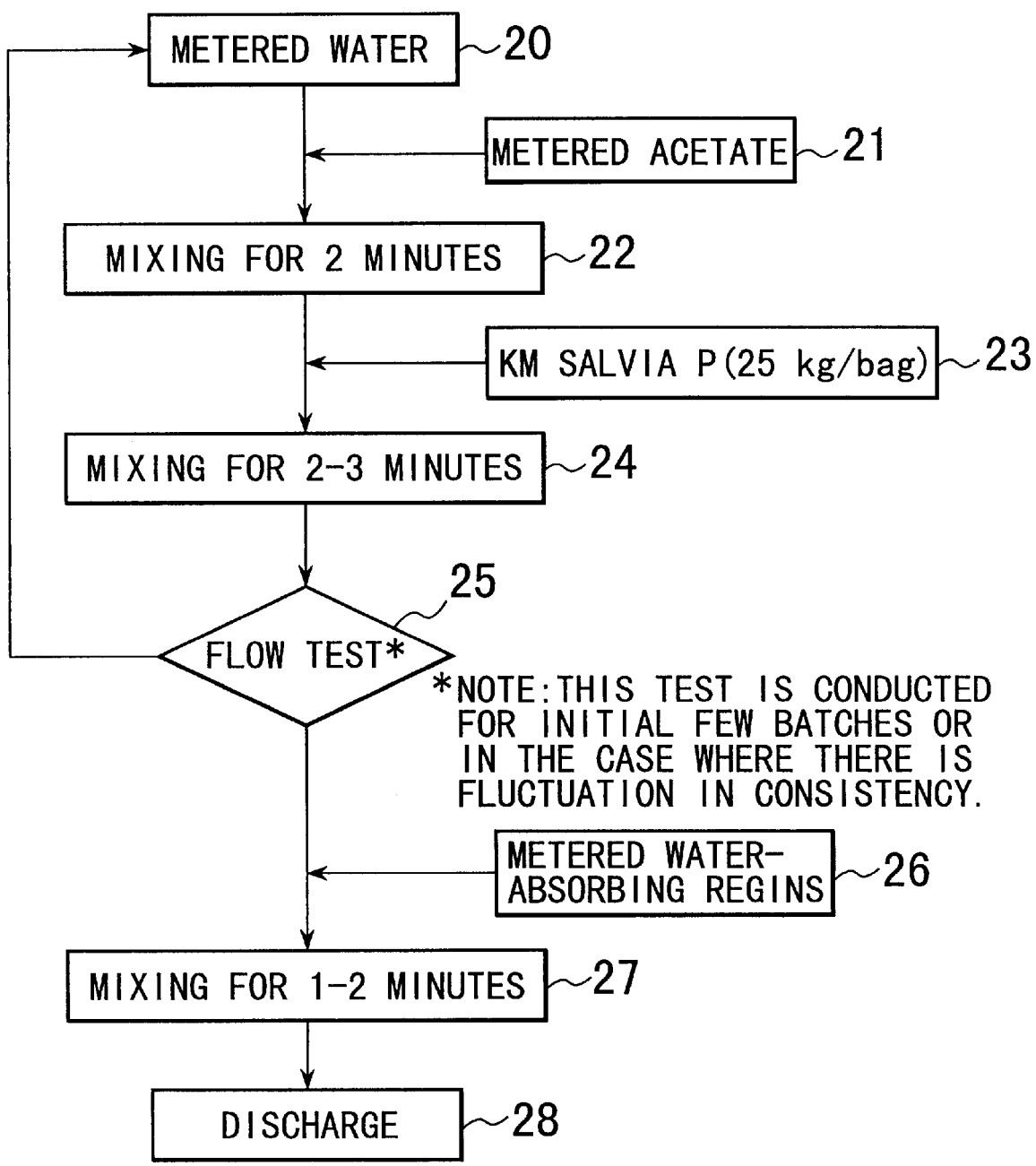
FIG. 2 is an example of the process for producing the slurry used in the present invention.

The above-mentioned slurry or anti-freeze cement milk can be prepared by the steps shown in FIG. 2.

A prescribed amount of water is metered in step 20, and a prescribed amount of powdery or granular salt is metered in step 21. The salt in this example is an acetate such as potassium acetate.

In step 22, the water and salt are mixed together in a mixer for 2 minutes. The resulting mixture is mixed with a prescribed amount of cement metered in step 23 by using a mixer for a few minutes in step 24. The cement in this example is KM Salvia P, which is a powdery cement of ultra-rapid-hardening type.

The mixing steps may be repeated for an initial few batches or for the resulting mixture which is found to vary in consistency by the flow test in step 25.

A prescribed amount of water-absorbing resins is metered in step 26, and it is mixed with the mixture of water, salt, and cement in a mixer for 1–2 minutes in step 27.

The thus obtained slurry or anti-freeze cement milk has typical properties as shown in Table 3 and gives an anti-freeze pavement having typical properties as shown in Table 3. In the final step 28, the slurry is discharged from the mixer and scattered over the pavement by means of a concrete chute or the like.

TABLE 3

| AGE | | VALUE | TEST METHOD |
| --- | --- | --- | --- |
| FREEZE-PREVENTING CEMENT MILK | | | |
| FLEXURAL STRENGTH (kgf/cm$^2$) | 3 HOURS | 17 | JIS R 5201 (20° C.) |
| | 1 DAY | 28 | |
| | 3 DAYS | 39 | |
| | 7 DAYS | 45 | |
| | 28 DAYS | 60 | |
| COMPRESSIVE STRENGTH (kgf/cm$^2$) | 3 HOURS | 47 | JIS R 5201 (20° C.) |
| | 1 DAY | 100 | |
| | 3 DAYS | 174 | |
| | 7 DAYS | 184 | |
| | 28 DAYS | 270 | |
| FLOW VALUE (SECOND) | | 10 | |
| WEIGHT PER UNIT VOLUME (kgf/cm$^3$) | | 1.72 | |
| FREEZE-PREVENTING PAVEMENT | | | |
| FLEXURAL STRENGTH (kgf/cm$^2$) | | 20 | HANDBOOK OF TEST METHODS |
| BREAKING STRAIN (×10$^{-3}$) | | 30 | |
| DYNAMIC STABILITY DS (cycles/mm) | | 20,000 | |
| AMOUNT OF RAVELLING WEAR (cm$^2$) | | 0.85 | |

After scattering, the pavement and scattered slurry are given vibration by means of a combined roller or the like. This vibration causes bubbles in the pavement to float and the slurry to infiltrate into the pavement. In this way it is possible to infiltrate a large amount of slurry efficiently into the pavement.

Excess slurry is removed from the pavement surface by suitable means such as gum raking, and the pavement surface is exposed. The slurry in the pavement solidifies afterward to make the pavement surface slippery.

The cement, salt and water-absorbing resin in the slurry infiltrated into the pavement are solidified by coagulation action of the cement. The salt in the solid prevents the pavement surface from freezing due to its freeze point depression. Therefore, the anti-freeze effect lasts for a long period of time.

The completed anti-freeze pavement 10 gradually decreases in its anti-freeze effect with the use. However, the effect lasts for a long period because the water-absorbing resins absorbs and retains the salt in a large amount. In addition, the anti-freeze pavement restores its anti-freeze effect if it is given the salt (of the same kind as contained in the slurry) again by scattering. The freshly scattered salt is absorbed and retained by the water-absorbing resins, so that the anti-freeze effect is restored.

The scattering of the slurry should preferably be carried out when the atmospheric temperature is 5° C. to 35° C. and the pavement temperature is lower than 45° C., since when the scattering of the slurry is carried out in a higher temperature condition, the scattered slurry solidifies so rapidly that it does not infiltrate into the pavement throughout.

Although the pavement in question is not necessarily limited to that of open-graded asphalt, it is preferable to be an ordinary asphalt pavement because it permits the slurry to infiltrate in a large amount into interstices in aggregates, which contributes to the prolonged anti-freeze effect. In addition, open-graded asphalt is superior in consistency or flowability resistance.

The greater the ability to absorb the salt is, the more desirable the water-absorbing resin is. This requirement is met by any polymer capable of absorbing and retaining 20% aqueous solution of calcium chloride 10 times or more its weight.

The water-absorbing resins mentioned above may be exemplified by at least one hygroscopic plastic selected from poly-N-vinylcarboxamides, polyacrylamides, polyvinyl alcohols, and polyethylene oxides. Of such examples, a crosslinked homopolymer or copolymer of N-vinylcarboxamides (PNVA) is preferable. Among them a preferred example is a crosslinked homopolymer of N-vinylacetamide, which is superior in weather resistance. Their details are found in Japanese Patent Appln. Public Disclosure Nos. 3-223304 and 4-346833.

A N-vinylcarboxamide is shown by the following general expression

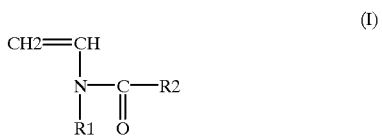

(I)

[wherein R1 and R2 independently represent a hydrogen atom or methyl group, or jointly C3–C4 alkylene group.] N-vinylacetamide, N-methyl-N-vinylacetamide, N-vinylformamide, N-methyl-N-vinylformamide, N-vinylpyrrolidone and the like are concretely exemplified, and N-vinylacetamide is preferable in the aspect of weatherability.

Also, cross-linked products which are polymerized with monomers copolymerizable with the N-vinylcarboxamides within the amount not detracting the above purpose may be used. As the monomers hydroxyethyl (meth)acrylate, hydroxypropyl (meth)acrylate, methyl (meth)acrylate, acrylonitrile, vinyl acetate, methyl vinyl ketone, (meth) acrylamide, N-alkyl substituted-(meth)acrylamide, (meth) acrylic acid and salts thereof and the like are concretely exemplified, but the monomers are used within the amount not detracting the above purpose, preferably 30% by weight or less based on the total amount of every monomer (excepting cross-linking agents). The use of the copolymerizable monomers more than the above amount is not preferable, because not only the absorbability of an aqueous solution containing salts at a high concentration is reduced but also the heat resistance, light resistance and the like are often lowered.

The cross-linked N-vinylcarboxamide in the present invention should be somehow cross-linked and made insoluble. To cross-link, compounds having at least two polymerizable unsaturated groups in one molecule and/or compounds which can form a chemical bond by reacting with a functional group in another monomer copolymerizable with N-vinylcarboxamide are added as a cross-linking agent to the above-mentioned monomer or its mixture for copolymerization and cross-linking of the monomer.

As cross-linking agents containing at least two polymerizable unsaturated groups in one molecule, there are exemplified tetraallyloxyethane, pentaerythritol tetraalkyl ether, pentaerythritol triallyl ether, trimethylopropane triallyl ether, ethylene glycol diallyl ether, diethylene glycol diallyl ether, triethylene glycol diallyl ether, diallyl ether; polyallyl ethers derived from compounds having at least two hydroxyl groups in one molecule such as monosaccharide, disaccharide, polysaccharide, cellulose and the like; polyallyl esters derived from compounds having at least two carboxyl groups in one molecule such as triallyl trimellitate, triallyl, citrate, diallyl oxalate, diallyl succinate, diallyl adipate, diallyl maleate, etc.; compounds having at least two allyl groups in one molecule such as diallylamine, triallyl isocyanate, etc.; compounds having at least two vinyl ester structures in one molecule such as divinyl oxalate, divinyl malonate, divinyl succinate, divinyl glutarate, divinyl adipate, trivinyl citrate, etc; bis (N-vinylcarboxylic acid amides) compounds such as N,N'-butylene bis (N-vinylacetamide), N,N'-diacetyl-N,N'-divinyl-1,4-bisaminomethyl cyclohexane; compounds having plural acrylamide structures or (meth)acryl groups such as N,N'-methylene bisacrylamide, ethylene glycol di(meth)acrylate, diethylene glycol di(meth)acrylate, polyethylene glycol di(meth)acrylate, trimethylopropane tri(meth)acrylate, pentaerythritol tri(meth)acrylate, etc.; compounds having at least two unsaturated groups in one molecule such as divinylbenzene, divinyl ether, aryl(meth)acrylate, etc.; such any known cross-linking agents can be used. These cross-linking agents may be used alone or as a mixture.

As another method of cross-linkage there are various methods; for example, firstly producing a prepolymer which has not been cross-linked, and then reacting with functional groups in the prepolymer to form chemical bonds, irradiating or using peroxides and the like.

The cross-linking agents which can react with functional groups in monomers to form chemical bonds may include, depending on the kinds of the functional groups, polyglycidyl ether, polyisocyanates, polyamines, polyols, polycarboxylic acids and the like. The amount of these cross-linking agents to be used is selected from the range of 90:10 to 99, 999:0.001 in the weight ratio of monomer (excepting cross-linking agents) to cross-linking agents in general, but 99:1 to 99, 995:0.005 is most preferable. If the amount of the cross-linking agents is less than 0.005 in weight ratio, the amount of water soluble polymers or hydrophilic polymers which are not cross-linked increases, so that the polymer which cannot act substantially as a water soluble resin is undesirably obtained, whereas in case of more than 10 the cross-linking density of the obtained water-absorbable resin increases so higher that the swelling degree undesirably decreases.

When the thus produced cross-linked N-vinylcarboxamide resin is prepared as a freeze-preventing material, those having a particle diameter of 4 mmø or less, preferably 2 mmø or less, and more preferably 1 mmø or less on the average are generally used. There is no particular limitation to a shape of the pulverulent body. It may have either a spherical or an irregular shape.

The cross-linked poly(N-vinylacetamide) resin in the present invention is prepared according to a known solution polymerization in water, a reversed phase suspension polymerization, a sedimentation polymerizaation and the like. Polymerization initiators used in the preparation of the above cross-linked (co)polymers may be selected from known peroxides, organic or inorganic peroxy acids or salts thereof, azobis compounds, which may be used alone or in the combination with a reducing agent such as redox type, particularly preferably azobis type initiators such as azobisisobutyronitrile, azobis(2-amidinopropane) dibasic acid salts and the like. Also, the amount of polymerization initiators to be used, the polymerization initiating temperature and the reaction time may be such an amount as to be used at the time of ordinary radical polymerization reaction. For example, the amount of the polymerization initiater to be used is $5 \times 10^{-4}$ to 5 mol % with the (co)polymeric ingredient as a reference, the polymerization initiating temperature is—10 to 80° C. or so, and the reaction time is 0.5 to 30 hours or so.

As a polyethylene oxide water-absorbing resin, those disclosed in JP-A-PD No.7-188643 or JP-A-PD No. 6-32863 can be used.

As a polyvinyl alcohol water-absorbing resin a cross-linked product which is obtained by hydrolyzing a homo- or copolymer of vinyl acetate and then cross-linking the resultant with glutaraldehyde may be used.

As a polyacrylamide type water-absorbing resin, one obtained by polymerizing an acrylamide alone or a mixture of an acrylamide and any other monomer polymerizable thereto with a cross-linking agent may be used.

As the polymerizable monomer with acrylamide there are exemplified comonomers copolymerizable similar to N-vinylcarboxylic amide such as (meth)acrylic acid esters, N-alkyl-substituted-(meth)acrylamide, vinylketones, (meth) acryliate and salts thereof.

The polyacrylamide water-absorbing resins can also be produced by a method similar to the method of polymerizing cross-linked N-vinylcarboxylic acidamide copolymers.

Further, the polyacrylamide hygroscopic resin can be produced by aa polymerization method similar to the method of producing cross-linked N-vinylcarboxylamide copolymer.

The salt that can be used in the present invention includes inorganic salts such as calcium chloride and potassium chloride and organic salts such as potassium acetate, calcium acetate, magnesium acetate, and sodium propionate. Of these examples, an acetate such as potassium acetate is preferable because of its greater freeze point depression than calcium chloride by about 20° C. Hence, it produces its freeze-preventing effect profoundly at low temperatures. Moreover, it is less corrosive to iron and other metals.

The cement that can be used in the present invention may be ordinary cement such as Portland cement. However, a rapid hardening cement, especially KM Salvia P of ultra-rapid-hardening type, is desirable in the case where it is necessary to put the pavement to use as soon as possible

EXAMPLES

In the following are exemplified how to produce water-absorbing resin powder and how to prevent freezing. The present invention is, however, not limited by these embodiments.

(Example of producing N-vinylcarboxamide cross-linking resin powder)

In a bath where a three-neck IL separable flask provided with an inlet pipe for nitrogen, a thermometer and an exhaust pipe, 250 g of N-vinylacetamide, 1.6 g of N,N'-diacetyl-N,N'divinyl-1,4-bisaminomethyl cyclohexene are resolved in 740 g of deionized water, and nitrogen was introduced for about one hour into the system at 1.0 L/min. to deair. Then, 600 mg of 2,2'-azobis(2-amidinopropane) dichloride salt resolved in 10 mL of the deaired water was added and left to stand still for 12 hours in a thermal insulation system. The obtained gel, after being cut with a mincer and vacuum-dried at 50° C. for 12 hours, was mechanically pulverized to obtain cross-linked resin powder having a particle diameter of 1 mm or less. 2 g of the obtained water-absorbing resin was immersed in 1 L of deionized water (25° C.) or in physiological saline solution (25° C.) for 2 hours under agitation, the swelled water-absorbing resin was separated by filtration. When the saturation absorption ratio was calculated according to the following formula, the water absorption ratio of the deionized water was thirty times its weight, and that of the physiological saline water thirty times its weight.

Absorption ratio=(weight of swelled water-absorbing resin/weight of prepared water-absorbing resin)−1

TABLE 4

|  | KM SAL-VIA P | WATER | POTAS-SIUM ACE-TATE | WATER-ABSORB-ING REGINS | CONCEN-TRATION OF ACETATE |
|---|---|---|---|---|---|
| FORMU-LATION A | 63.5 | 31.5 | 4.5 | 0.5 | 60% |
| FORMU-LATION B | 63.5 | 32.5 | 3.5 | 0.5 | 50% |
| FORMU-LATION C | 63.5 | 33.0 | 3.0 | 0.5 | 40% |

FORMULATION BY WEIGHT

Three slurries of formulations A, B, and C shown in Table 4 were prepared by the procedure explained above with reference to FIG. 2. The water-absorbing resins in each formulation is the resin powder obtained in the above-mentioned example of production.

Each slurry was scattered over a pavement of open-graded asphalt whose properties are shown in Table 3. After scattering, the pavement was given vibration by means of a combined roller, so that the slurry infiltrated into the pavement. The scattered slurry was raked repeatedly until no bubbles floated any longer after the combined roller had passed.

Figure 3:
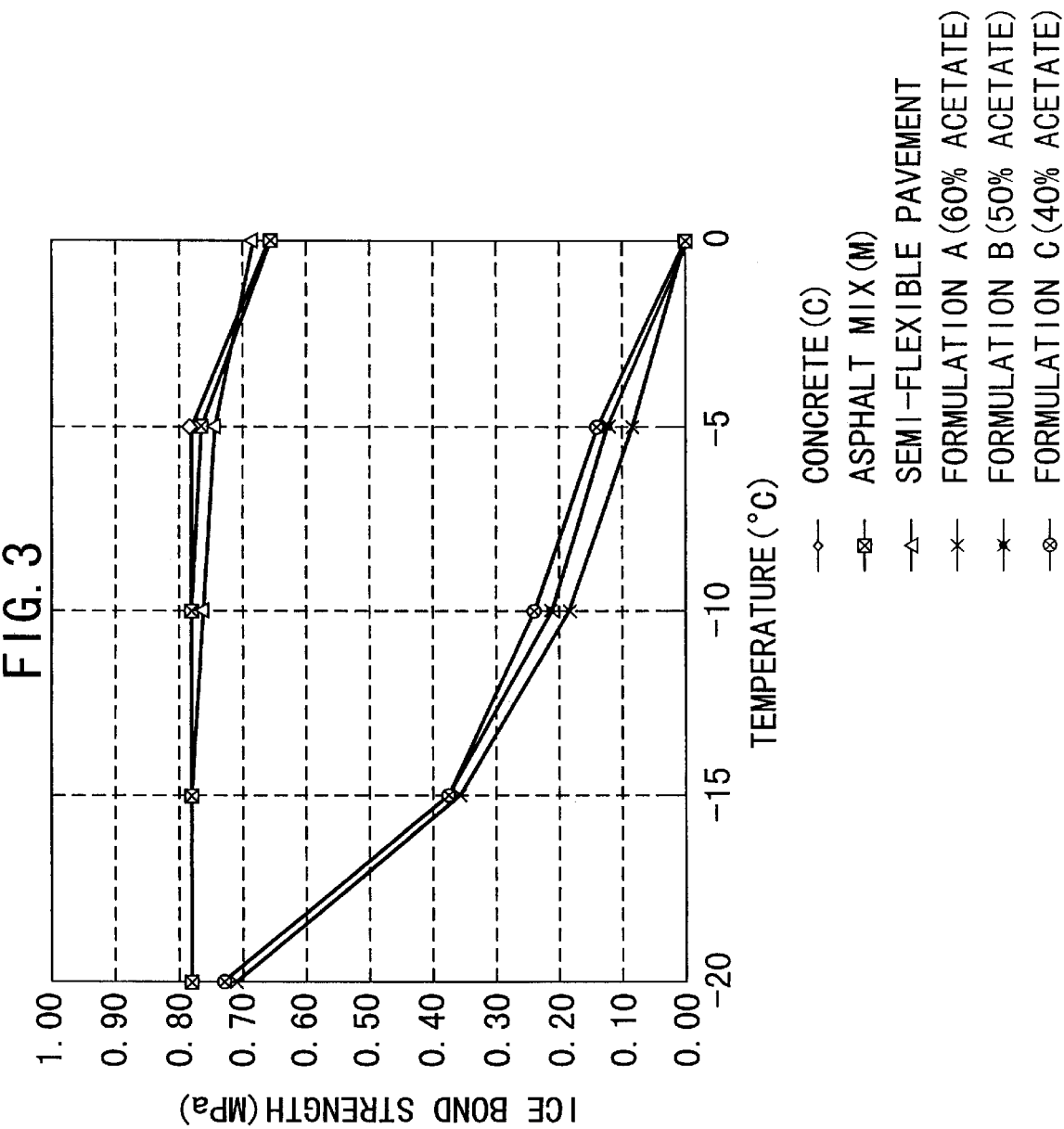
FIG. 3 is a graphical representation of the result of ice bond strength test for the freeze-preventing pavement pertaining to the present invention.

As the result, the slurry produced the anti-freeze effect as shown in FIGS. 3 and 4 in terms of ice bond strength on the anti-freeze pavement as well as convention al concrete pavement, asphalt mix pavement, and semi-flexible pavement.

In FIG. 3, ice bond strength is plotted against temperature. It is apparent from FIG. 3 that the ice bond strength of the anti-freeze pavement 10 pertaining to the present invention (regardless of salt content) is about ⅐, ¼, and ½ at −5° C., −10° C., and −15° C., respectively, of that of conventional concrete pavement, asphalt mix pavement, and semi-flexible pavement. The low ice bond strength implies that ice covering the pavement is easily peeled off by traffic loads.

In FIG. 4, ice bond strength is plotted against the number of icing tests which were repeated at −10° C. It is apparent from FIG. 4 that the ice bond strength of the anti-freeze pavement 10 pertaining to the present invention (regardless of salt content) tends to increase gradually as the icing test is repeated. When the ice bond strength had reached the maximum value of about 0.25 MPa, the anti-freeze pavement 10 was sprayed with the salt. The ice bond strength suddenly decreased to about 0.1 MPa, presumably, owing to the salt remaining on the pavement surface. After repeated icing tests, the ice bond strength gradually approached about 0.25 MPa. This suggests that the anti-freeze effect is restored when the pavement is sprayed with the salt.

The idea of the present invention may be applied also to the freeze-preventing material and method for ordinary asphalt pavements, Instead of simultaneously scattering salts and water-absorbing resins over the pavement surface, the salts may be scattered over the pavement surface after scattering the cement and the water-absorbing resins in the form of slurry.

Effect of the invention:

The freeze-preventing material and method pertaining to the present invention produce a prolonged anti-freeze effect because the salt is retained in high concentrations by the water-absorbing resins in the pavement. Moreover, the anti-freeze effect can be restored when the pavement is sprayed with the salt again.

It will be apparent to those skilled in the art, that various modifications and variations can be made in the materials and method of the present invention. Thus, it is intended that the present invention cover the modifications and variations of this invention, provided they come within the scope of the appended claims and their equivalents.

What is claimed is:

1. A freeze-preventing material comprising cement, a sat, and a water-absorbing resin, wherein the salt is an acetate.

2. A freeze-preventing material as defined in claim 1, wherein said water-absorbing resin is a polymer which absorbs an aqueous solution containing 20% calcium chloride in an amount at least 10 times of said polymer's weight.

3. A freeze-preventing material as defined in claim 1, wherein said water-absorbing resin is at least one polymer selected from the group consisting of poly-N-vinylcarboxamides, polyacrylamides, polyvinyl alcohols, and polyethylene oxides.

4. A freeze-preventing material as defined in claim 2, wherein said water-absorbing resin is at least one polymer selected from the group consisting of poly-N-vinylcarboxamides, polyacrylamides, polyvinyl alcohols, and polyethylene oxides.

5. A freeze-preventing material as defined in claim 1, wherein said acetate is selected from the group consisting of potassium acetate, calcium acetate, magnesium acetate and sodium propionate.

* * * * *